(12) United States Patent
Alameh et al.

(10) Patent No.: US 11,284,236 B2
(45) Date of Patent: Mar. 22, 2022

(54) DEVICE PRESENCE DETECTION SYSTEM

(71) Applicant: Motorola Mobility LLC, Chicago, IL (US)

(72) Inventors: Rachid M. Alameh, Crystal Lake, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 117 days.

(21) Appl. No.: 16/845,994

(22) Filed: Apr. 10, 2020

(65) Prior Publication Data

US 2021/0321237 A1  Oct. 14, 2021

(51) Int. Cl.
| | |
|---|---|
| *H04W 4/70* | (2018.01) |
| *H04W 4/029* | (2018.01) |
| *H04W 92/18* | (2009.01) |
| *H04W 4/80* | (2018.01) |
| *H04W 4/021* | (2018.01) |

(52) U.S. Cl.
CPC ............ *H04W 4/70* (2018.02); *H04W 4/022* (2013.01); *H04W 4/029* (2018.02); *H04W 4/80* (2018.02); *H04W 92/18* (2013.01)

(58) Field of Classification Search
CPC . G06K 9/00275; G06F 11/3051; H04L 9/008; H04L 9/3247; H04L 41/14; H04L 43/14; H04B 5/0062
See application file for complete search history.

(56) References Cited

U.S. PATENT DOCUMENTS

| | | | |
|---|---|---|---|
| 2017/0300480 A1* | 10/2017 | Ayik | G06F 40/18 |
| 2019/0073712 A1* | 3/2019 | Nickerson | G06F 3/1454 |
| 2020/0241536 A1* | 7/2020 | Liu | G05D 1/0274 |

OTHER PUBLICATIONS

"Homey App", Retrieved at: https://homey.app/fr-ch/app/nl.scanno.owntracks/Location-and-Presence/—on Feb. 18, 2020, 3 pages.
"Manage your Android device's location settings", Retrieved at: https://support.google.com/android/answer/3467281?hl=en—on Feb. 18, 2020, 4 pages.
"Apple Developer—Documentation Core Location", Retrieved at: https://developer.apple.com/documentation/corelocation/—on Feb. 18, 2020, 5 pages.

* cited by examiner

*Primary Examiner* — Iqbal Zaidi
(74) *Attorney, Agent, or Firm* — FIG. 1 Patents

(57) ABSTRACT

A determination is made as to when two computing devices are in the presence of each other, also referred to as the two computing devices being colocated. This determination is made based on wireless location signals received at the two computing devices as well as environment data sensed by the two computing devices. The computing devices determine whether they are in the presence of each other and enable multi-device engagement in response to determining that the two computing devices are in the presence of each other.

20 Claims, 6 Drawing Sheets

DEVICE PRESENCE DETECTION SYSTEM

BACKGROUND

As technology has advanced various different types of computing devices have become commonplace. These different types of computing devices include, for example, desktop devices, portable devices (e.g., laptops, tablets, mobile phones), and wearable devices (e.g., watches, eyeglasses). Situations can arise where knowing the location of a computing device is beneficial. Conventional techniques for determining the location of a computing device include determining the location based on Global Positioning System (GPS) signals received at the computing device or Wi-Fi signals received at the computing device. While these techniques are useful, they are not without their problems. One such problem is that situations arise where the locations determined using these techniques lack the accuracy that a user desires, resulting in user frustration and dissatisfaction with their computing devices.

BRIEF DESCRIPTION OF THE DRAWINGS

Embodiments of a device presence detection system are described with reference to the following drawings. The same numbers are used throughout the drawings to reference like features and components.

DETAILED DESCRIPTION

Figure 1:
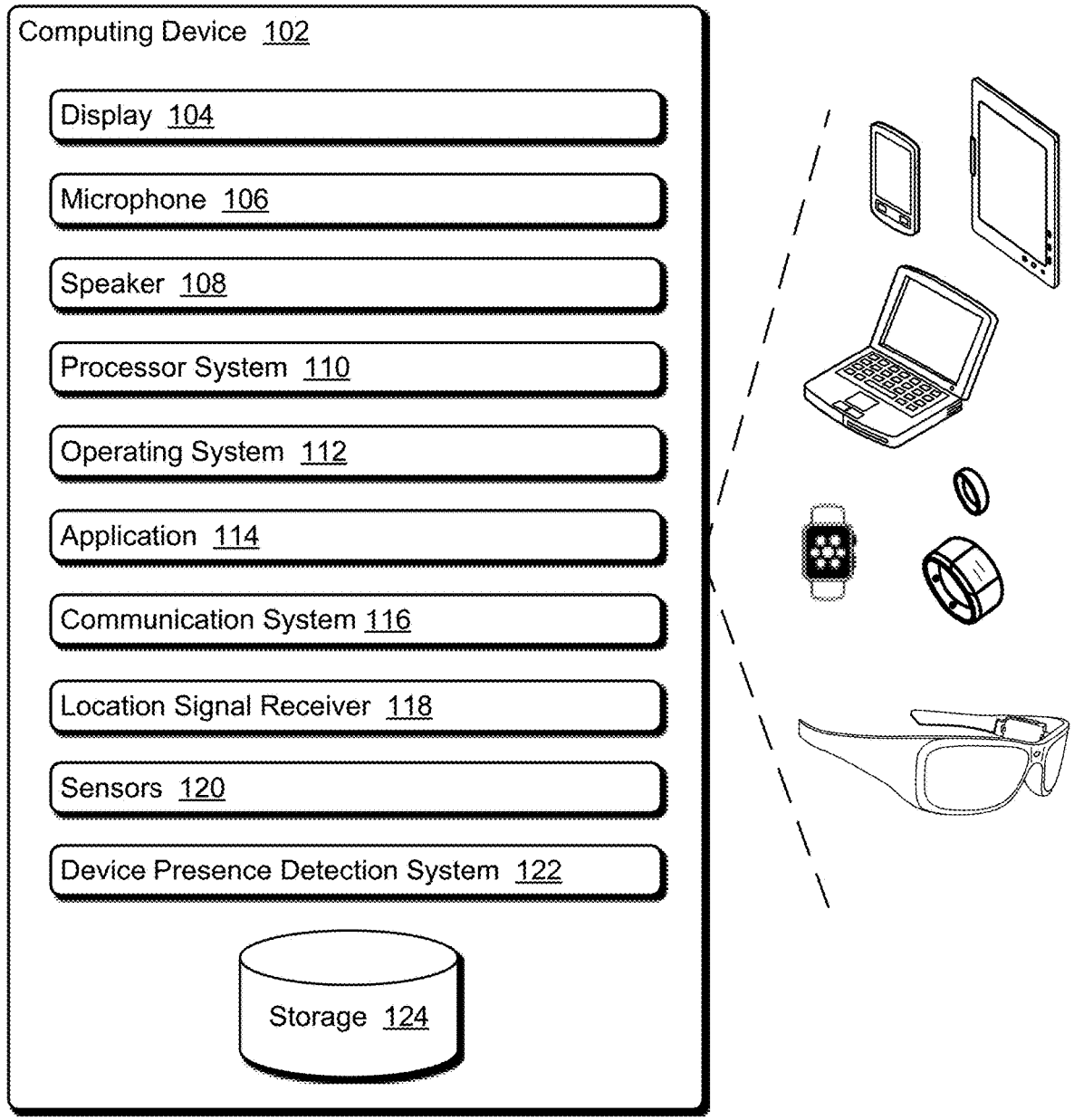
FIG. 1 illustrates an example computing device implementing the techniques discussed herein.

A device presence detection system is discussed herein. Generally, a determination is made as to when two computing devices are in the presence of each other. Two devices being in the presence of each other is also referred to as the two computing devices being colocated or the two computing devices having true presence. This determination is made based on wireless location signals received at the two computing devices as well as environment data sensed by the two computing devices. The computing devices determine whether they are in the presence of each other and enable multi-device engagement in response to determining that the two computing devices are in the presence of each other. Multi-device engagement allows the two computing devices to perform various operations collaboratively, such as backing up files from one to another.

More specifically, each computing device receives wireless location signals that are used by the computing device to determine its physical location. These wireless location signals can be any of a variety of different signals, such as Global Positioning System (GPS) signals, Wi-Fi signals, cellular signals, short-range beacon signals (e.g., Bluetooth Low Energy) signals, and so forth. Each computing device also includes one or more sensors to detect or sense various data regarding the environment in which the computing device is situated, referred to herein as environment data. This environment data can take various forms, such as audio (e.g., voices), video or images (e.g., of people), motion of the computing device, and so forth.

At least one of the computing devices also includes a device presence detection system that receives the wireless location signals received by both of the computing devices. The device presence detection system determines whether the two computing devices are at similar physical locations based on these wireless location signals. For example, if the wireless location signals indicate that the two devices are within a threshold distance of one another (e.g., 10 feet), then the device presence detection system determines that the two computing devices are at similar physical locations. This threshold distance is selected, for example, to be a distance within which the two computing devices are typically deemed to be in the presence of one another. If the two computing devices are beyond that threshold distance away from one another then the two computing devices are deemed to be too far apart to be in the presence of one another.

The device presence detection system also determines whether the environment data sensed by the two computing devices match. This determination can be made at various times, such as in response to determining that the two computing devices are at similar physical locations. Whether the environment data sensed by the two computing devices match can be determined in various manners based on the particular type of environment data. For example, the environment data may match if the same user is sensed by each of the computing devices, if the same audio is sensed by each of the computing devices, and so forth.

The device presence detection system determines that the two computing devices are in each other's presence if they are at similar physical locations and they sense matching environment data. However, the device presence detection system determines that the two computing devices are not in each other's presence if they are not at similar physical locations or they do not sense matching environment data. Physical location match or proximity alone is not sufficient for true presence. Once physical location match or proximity is determined, then other contextual data match is evaluated before determining true presence of the two devices.

Multi-device engagement is enabled for the two computing devices in response to the device presence detection system determining that the two computing devices are in each other's presence. Multi-device engagement refers to the two computing devices working together to perform one or more actions, such as copying data from one device to the other, one computing device offloading operations to another (e.g., a wearable device offloading processor-intensive operations to a more powerful desktop device), and so forth.

The various embodiments described herein improve upon the state of the art by accurately determining whether two computing devices are in each other's presence. Use of wireless location signals alone to determine whether two computing devices are in each other's presence can result in inaccurate determinations because the two computing devices may be in similar physical locations but not in each other's presence. For example, if the two computing devices are located in two separate rooms of a house separated by a wall, the two computing devices are not in each other's presence even if they are physically close to one another (e.g., are less than three feet apart). By using the environment data sensed by each of the two computing devices as well as the physical locations of the two computing devices, the techniques discussed herein accurately determine whether the two computing devices are in each other's presence.

FIG. 1 illustrates an example computing device 102 implementing the techniques discussed herein. The computing device 102 can be many different types of computing or electronic devices, such as a smartphone or other wireless phone, a notebook computer (e.g., netbook or ultrabook), a laptop computer, a wearable device (e.g., a smartwatch, a ring or other jewelry, augmented reality headsets or glasses, virtual reality headsets or glasses), a tablet or phablet computer, an Internet of Things (IoT) device, a fitness tracker, a smart TV, a vehicle, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system manages communication with various other devices, including establishing voice calls with other devices, messaging with other devices, and so forth. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, and so forth.

The computing device 102 also includes one or more location signal receivers 118. A variety of different types of wireless location signal receivers 118 can be included in the computing device 102 that receive wireless signals using various different standards or techniques. For example, the location signal receivers 118 can be GPS receivers, Wi-Fi transceivers, short-range beacon signal receivers (e.g., Bluetooth Low Energy receivers), and so forth.

The computing device 102 also includes one or more sensors 120. A variety of different types of sensors 120 can be included in the computing device 102, such as an image capture device (e.g., a camera), a biometric data sensor (e.g., a heart rate sensor, a fingerprint sensor), a motion sensor (e.g., an accelerometer, a gyroscope, a magnetic field sensor), a thermal sensor, a proximity sensor, an active IR sensor, a passive IR sensor, a microphone, a motion sensor, an elevation sensor, an ultrasound sensor, and so forth. These sensors 120 detect or sense environment data for the computing device 102.

The computing device 102 also includes a device presence detection system 122. The device presence detection system 122 determines, based on the location signals received by at least one location signal receiver 118 and the environment data sensed by at least one sensor 120, whether the computing device 102 is in the presence of one or more other computing devices 102.

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for the operating system 112, application 114, other systems, and so forth.

Figure 2:
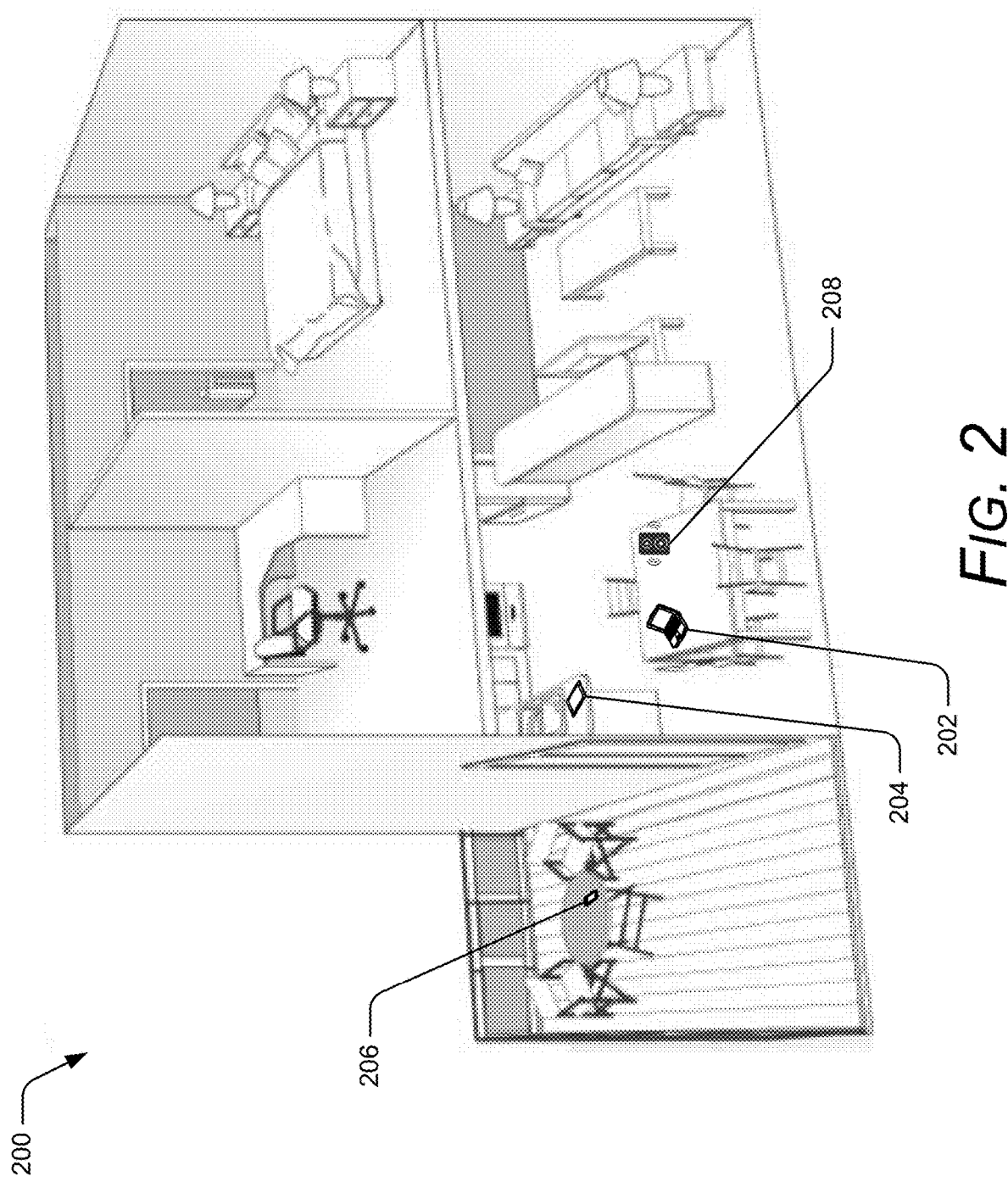
FIG. 2 illustrates an example use of the device presence detection system discussed herein.

FIG. 2 illustrates an example use of the device presence detection system discussed herein. FIG. 2 shows a house 200 with multiple rooms. Devices 202, 204, and 206 are illustrated in the house 200. Devices 202 and 204 are in the same room and are in the presence of each other. Device 206 is physically close to devices 202 and 204, however, is on a table outside rather than inside the house and is separated from the devices 202 and 204 by a wall and a door. The device 206 cannot detect or sense the audio output by a speaker 208 due to the wall and door, however devices 202 and 204 in the same room as the speaker 208 can detect or sense the audio output by the speaker 208.

Accordingly, device 206 is not in the presence of either device 202 or device 204, nor is either device 202 or device 204 in the presence of device 206. It should be noted that the physical distance between the device 206 and each of the devices 202 and 204 may be small enough so that a determination that the device 206 is not in the presence of either device 202 or 204 may not be able to be made based on the received wireless location signals alone. This is illustrated in FIG. 2 by the devices being separated by a wall, although the devices could similarly be situated directly below or above each other on different floors of a house. By also analyzing the environment data sensed by the devices 202, 204, and 206, the determination that the device 206 is not in the presence of either device 202 or device 204 can be made.

Figure 3:
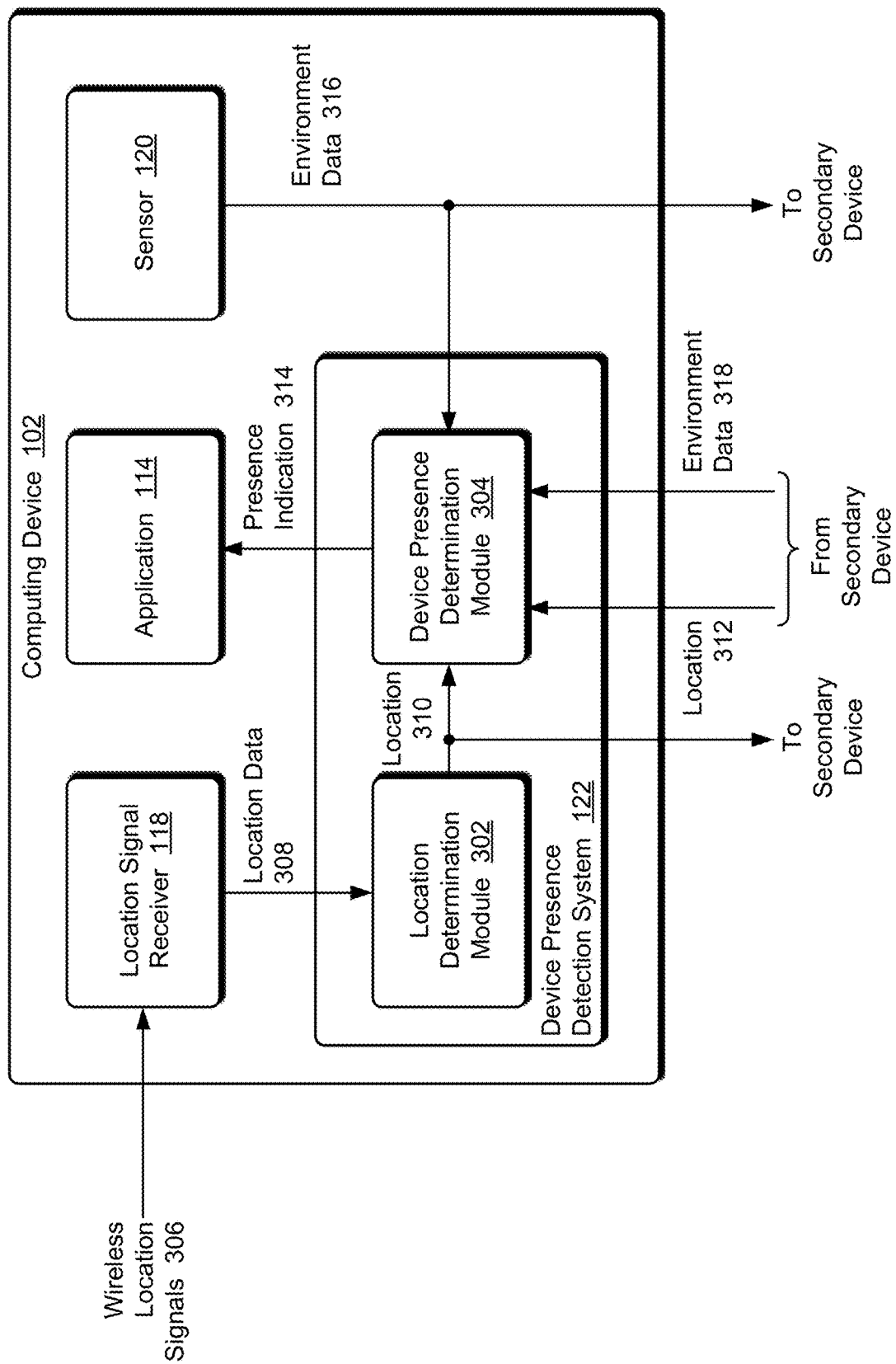
FIG. 3 illustrates an example architecture implementing the device presence detection system discussed herein.

FIG. 3 illustrates an example architecture implementing the device presence detection system discussed herein. The device presence detection system 122 includes a location determination module 302 and a device presence determination module 304. The device presence detection system 122 determines whether the computing device 102 is in the presence of a secondary device (e.g., another computing device that, analogous to the computing device 102, can be any of a variety of types of devices). The location signal receiver 118 receives wireless location signals 306, which can be various location signals as discussed above (e.g., GPS signals, Wi-Fi signals, short-range beacon signals, cellular signals, combinations thereof). The wireless location signals 306 can be transmitted by various devices, such as a satellite, a Wi-Fi access point, a beacon transmitter, a cellular tower transmitter, and so forth. The location signal receiver 118 extracts location data from the wireless location signals 306 and provides the extracted location data to the location determination module 302 as location data 308.

The location determination module 302 receives the location data 308 and determines the location of the computing device 102 based on the location data 308. The location of the device can be specified in various manners, such as using geographic coordinates. The location determination module 302 can determine the location of the computing device 102 in various manners based on the particular location data 308. In one or more embodiments, the location data 308 implicitly identifies the location of the device and the location determination module 302 uses the location data 308 to determine the location of the device. The location determination module 302 can make this determination in various manners, such as by using triangulation based on wireless location signals 306 received from different transmitters, using a network name (e.g., service set identifier (SSID)) and signal strength (e.g., received signal strength indicator (RSSI)) included in the wireless location signals 306, and so forth.

Additionally or alternatively, the location data 308 explicitly identifies the location of the wireless location signal transmitter. For example, a short-range beacon signal can explicitly identify the location of the beacon transmitter, and the location determination module 302 can use that location as the location of the device (e.g., due to the short-range nature of the beacon signal).

The location determination module 302 provides the determined location 310 of the computing device 102 to the device presence determination module 304. The device presence determination module 304 also receives a secondary device location 312 from the secondary device. The device presence detection module 304 determines whether the computing device 102 is in a similar physical location as the secondary device. The device presence detection module 304 can make this determination based on the location 310 and the secondary device location 312. In one or more embodiments, if the locations 310 and 312 are within a threshold distance of one another (e.g., 15 feet), then the device presence detection module 304 determines that the computing device 102 and the secondary device are at similar physical locations. This threshold distance is selected, for example, to be a distance within which the two devices are typically deemed to be in the presence of one another. If the locations 310 and 312 are not within the threshold distance of one another then the device presence determination module 304 determines that the computing device 102 and the secondary device are not at similar physical locations and thus that the two devices are not in the presence of each other (true presence is not valid).

In one or more embodiments, the device presence determination module 304 further determines whether the computing device 102 and the secondary device are both at the same location of one or more particular physical locations. These particular physical locations can be obtained in various manners, such as being pre-configured in the device presence determination module 304, being obtained from an application 114 performing multi-device engagement, being obtained from another device or system, being specified by a user of the computing device 102, and so forth. In such embodiments, the device presence determination module 304 includes data in the presence indication 314 that indicates whether the computing device 102 and the secondary device are both at the same location of one or more particular physical locations. Additionally or alternatively, the application 114 can determine whether the computing device 102 is at one of the one or more particular physical locations (e.g., the application 114 may receive location data 308 or location 310) and thus the presence indication 314 need include no such indication.

By knowing whether the computing device 102 is in a particular physical location the application 114 can prohibit or cease multi-device engagement actions in situations in which the computing device 102 is not in a particular physical location regardless of whether the computing device 102 and the secondary device are in the presence of each other. This provides an additional level of security when performing the multi-device engagement actions, such as by allowing multi-device engagement actions to be performed only when the user trusts the location (e.g., and the network over which the devices communicate) of the computing device 102 (e.g., only when the computing device 102 is at the owner's home or office). For example, for certain multi-device engagement actions, such as copying data from one device to another, the application 114 may desire to have the actions taken only at certain physical locations, such as in the user's home or office. Accordingly, if the computing device 102 and the secondary device are taken from the owner's home by someone other than the owner, the multi-device engagement actions would not be performed regardless of whether the computing device 102 and the secondary device are in the presence of each other.

The sensor 120 senses or detects various information regarding the environment that the computing device 102 is in and provides this information to the device presence determination module 304 as environment data 316. This environment data 316 can include various data, such as data describing audio sensed by the sensor 120, images or video sensed by the sensor 120, motion sensed by the sensor 120, biometric information sensed by the sensor 120, combinations thereof, and so forth. In one or more embodiments, the environment data 316 used to determine whether two devices are in the presence of each other is data obtained from sensors that are blocked (or substantially blocked) by walls, such as imagers, sound sensors, and thermal sensors. This allows a more accurate determination to be made as to whether two devices are in the presence of each other because it reduces or eliminates the possibility of two devices separated by a wall (e.g., in adjacent rooms) being determined to be in the presence of each other.

The device presence determination module 304 also receives secondary device environment data 318 from the secondary device. The secondary device senses or detects environment data 318 for the secondary device using one or more sensors analogous to the sensor 120. The device presence detection module 304 determines whether the environment data 316 matches the secondary environment data 318. Whether the environment data 316 matches the secondary environment data 318 can be determined in various manners based on the particular type of environment data. For example, the environment data may match if the same user is sensed by each of the computing devices, if the same audio is sensed by each of the computing devices, combinations thereof, and so forth.

In one or more embodiments, the environment data 316 and the secondary environment data 318 include audio data describing audio sensed at the two devices. In one or more implementations, the device presence determination module 304 determines whether the audio data sensed at the two devices matches by identifying a particular type of audio indicated in the environment data 316 and 318, such as a particular user's voice or a particular background noise (e.g., a particular song playing, a particular television show or movie playing, and so forth). If the same type of audio is included in both the environment data 316 and 318, and the audio is synchronized, then the device presence determination module 304 determines that the environment data 316 matches the secondary environment data 318. The audio being synchronized refers to the same audio characteristics (e.g., the same voice, the same song, the same movie audio) being sensed by the computing device 102 and secondary device at approximately the same time (e.g., as identified by timestamps in the environment data 316 and 318 indicating when the audio is sensed). Any of a variety of public or proprietary audio detection techniques (e.g., voice detection techniques, song detection techniques, movie soundtrack or dialog detection techniques) can be used to determine whether the same type of audio is included and synchronized in the environment data 316 and 318.

In one or more embodiments, the device presence determination module 304 can determine whether the audio data sensed by the two devices matches by simply comparing the environment data 316 and 318 without regard for what type of audio is sensed. Any of a variety of public or proprietary audio detection techniques can be used to compare characteristics of the audio data in the environment data 316 and 318. These characteristics can include, for example, the sound level of the audio data (e.g., measured in decibels), the frequency of the audio data, the amplitude of the audio data, and so forth.

In some situations, the environment data 316 and 318 may both indicate silence (e.g., no one speaking, no song being played, no sound detected above a particular sound level (e.g., 30 decibels)). In such situations the device presence determination module 304 determines that the environment data 316 and 318 does not match. This avoids the situation of two devices being in silence in two different rooms being determined to be in the presence of each other.

In one or more embodiments, the environment data 316 and the secondary environment data 318 include data describing images or video sensed at the two devices. Any of a variety of public or proprietary audio detection techniques can be used to compare characteristics of the video data in the environment data 316 and 318. In one or more implementations, the device presence determination module 304 determines whether the images or video data sensed at the two devices matches by performing object detection in the environment data 316 and 318 and determining whether the same objects are included in both the environment data 316 and 318. Various different detected objects, such as those sensed by an imager, can be used, such as people, furniture, decorations (e.g., wall hangings), and so forth.

Additionally or alternatively, the device presence determination module 304 can compare other characteristics of the images or video in the environment data 316 and 318, such as colors in the images or video, light level in the images or video, movement of objects in a sequence of images or in video, combinations thereof, and so forth.

In one or more embodiments, the environment data 316 and the secondary environment data 318 include data describing motion sensed at the two devices. Any of a variety of public or proprietary motion detection techniques can be used to compare characteristics of the motion data in the environment data 316 and 318. In one or more implementations, the device presence determination module 304 determines whether the motion data sensed at the two devices matches by analyzing characteristics of the motion data in the environment data 316 and 318. Various different characteristics can be analyzed, such as a sensed speed, a sensed direction such as in a vehicle setting, a sensed vibration pattern such as carried by the same user, synchronized accelerometer motion (e.g., sensed starting of motion and sensed ending of motion are at the same time), combinations thereof, and so forth.

When using motion data, the device presence determination module 304 determines that the environment data 316 and 318 match if the analyzed characteristics are the same or within a threshold amount of one another. This threshold amount can be a fixed amount (e.g., speeds within 3 miles per hour of each other, directions within 3 degrees of each other) or relative amounts (e.g., speeds within 5% of each other, directions within 5% of each other). If the analyzed characteristics are not the same and are not within a threshold amount of one another, then the device presence determination module 304 determines that the environment data 316 and 318 do not match. For example, if the computing device 102 and the secondary device are in the same vehicle (e.g., a car), then the environment data 316 and 318 will indicate the same speed and direction, as well as the same starting and ending motions, the same changes in speed or direction, and so forth.

Additionally or alternatively, the environment data 316 and the secondary environment data 318 include data describing biometric information sensed at the two devices. Any of a variety of public or proprietary audio detection techniques can be used to compare characteristics of the biometric data in the environment data 316 and 318. In one or more implementations, the device presence determination module 304 determines whether the biometric information sensed at the two devices matches by analyzing characteristics of the biometric data in the environment data 316 and 318. Various different characteristics can be analyzed, such as detecting the same heart rate (e.g., heartbeats are sensed at the same time), detecting the same fingerprint, combinations thereof, and so forth.

When using biometric data, the device presence determination module 304 determines that the environment data 316 and 318 match if the analyzed characteristics are the same or within a threshold amount of one another. This threshold amount can be a fixed amount (e.g., heartbeats sensed within 5 milliseconds of each other) or relative amounts (e.g., heartbeats synchronized within 5% of the heart rate of each other or beats are in synchronization with each other). If the analyzed characteristics are not the same and are not within a threshold amount of one another, then the device presence determination module 304 determines that the environment data 316 and 318 do not match.

In some situations the environment data 316 and 318 matching is alone sufficient to indicate that the two computing devices are in the presence of each other and whether the locations 310 and 312 are similar physical locations need not be determined. For example, situations where heart beats are in synchronization with each other and motion of the devices is in synchronization can be enough to determine that the two devices are in the presence of each other and location proximity determination such as GPS, cellular, or Wi-Fi need not be relied on for true presence determination. This allows, for example, a determination to be made that two devices are in the presence of each other in bad coverage areas where the physical location is not available (e.g., no wireless location signals 306 are received).

Although discussion is made herein with reference to determining that environment data 316 and 318 match based on the threshold values, additionally or alternatively the device presence determination module 304 can determine whether the environment data 316 and 318 match in other manners. For example, the device presence determination module 304 can determine whether the environment data 316 and 318 match by applying other rules or criteria to the environment data 316 and 318, by applying machine learning systems trained to determine whether environment data 316 and 318 match, and so forth.

The device presence determination module 304 determines that the computing device 102 and the secondary device are in each other's presence if the two devices are at similar physical locations (locations 310 and 312 match) and they sense matching environment data (environment data 316 and 318 match). However, the device presence determination module 304 determines that the computing device 102 and the secondary device are not in each other's presence if the two devices are not at similar physical locations or they do not sense matching environment data. The device presence determination module 304 outputs a presence indication 314 indicating whether the computing device 102 and the secondary device are in each other's presence.

The presence indication 314 is used by an application 114 to determine whether multi-device engagement is enabled for the computing device 102 and the secondary device. Although discussed herein with reference to an application 114, multi-device engagement can be performed by other programs or modules (e.g., a program of the operating system 112). Multi-device engagement is enabled for the computing device 102 and the secondary device in response to the device presence determination module determining that the two computing devices are in each other's presence. Multi-device engagement refers to the two computing devices working together to perform one or more actions, such as copying data from one device to the other, one computing device offloading operations to another (e.g., a wearable device offloading processor-intensive operations to a more powerful desktop device), devices backing up data such as split backups, and so forth.

The actions performed as part of the multi-device engagement can vary based on the application 114 that is performing the multi-device engagement. In some situations the application 114 may perform multi-device engagement only in situations in which the two devices are in the presence of each other especially for high security engagement. In other situations, such as situations where security of the data being transferred between the devices is not as important, the application 114 may perform multi-device engagement regardless of whether the two devices are in the presence of each other. The determination of whether two devices need to be in the presence of each other in order to perform multi-device engagement can be made by the application 114 based on various different rules or criteria.

In one or more embodiments, the device presence determination module 304 determines whether the environment data 316 matches the environment data 318 only in response to determining that the locations 310 and 312 are similar physical locations. If the locations 310 and 312 are not similar physical locations, then the computing device 102 and the secondary device will not be in the presence of each other. Accordingly, the device presence determination module 304 can output the presence indication 314 indicating that the two devices are not in the presence of each other without determining whether the environment data 316 and 318 match. In such situations, the device presence determination module 304 is alleviated of the need to expend time or resources (e.g., processor, memory) determining whether the environment data 316 and 318 match.

Additionally or alternatively, the device presence determination module 304 can determine whether the locations 310 and 312 are similar physical locations only in response to determining that the environment data 316 matches the environment data 318, or determine whether the environment data 316 matches the environment data 318 regardless of whether the locations 310 and 312 are determined to be similar physical locations.

In one or more embodiments, the computing device 102 also provides the location 310 and the environment data 316 to the secondary device so that the secondary device can itself determine whether the two devices are in the presence of each other. In such situations, each of the two devices generates its own presence indication (analogous to the discussion above) so that applications or programs on that device know that multi-device engagement can be performed by the two devices. Additionally or alternatively, a single device (e.g., the computing device 102) may make the determination and the presence indication is sent to the other device (e.g., the secondary device) so that the other device need not make the presence determination.

In one or more embodiments, the device presence determination module 304 verifies whether the computing device 102 and the secondary device remain in the presence of each other at regular or irregular intervals, such as every threshold number of seconds (e.g., 15 seconds), in response to certain events (e.g., a change in motion sensed by the sensor 120), and so forth. The device presence determination module 304 verifies whether the computing device 102 and the secondary device are in the presence of each other in the same manner as discussed above, based on the locations 310 and 312 and the environment data 316 and 318.

The device presence determination module 304 takes various different actions based on whether the computing device 102 and the secondary device are verified as still being in the presence of each other. In response to the device presence determination module 304 verifying that the devices are still in the presence of each other, the device presence determination module 304 continues to provide the presence indication 314 indicating that the devices are in the presence of each other. This allows the multi-device engagement to continue.

It should be noted that situations can arise in which the locations 310 and 312 change, or the environment data 316 and 318 change, but change in the same manner. For example, the physical locations 310 and 312 are both determined to be different than they were previously (e.g., 10 seconds ago), but are still similar physical locations. By way of another example, the environment data 316 and 318 may both have changed but still match, such as if a different background noise is sensed by both devices. In such situations, the device presence determination module 304 continues to provide the presence indication 314 indicating that the devices are in the presence of each other, allowing the multi-device engagement to continue. However, the multi-device engagement may continue in different manners. For example, due to a change in the physical locations of the devices the Wi-Fi network over which the multi-device engagement occurs may change, the type of wireless communication the devices use may change (e.g., from Wi-Fi to Bluetooth), and so forth.

In response to the device presence determination module 304 determining that the locations 310 and 312 no longer indicate similar physical locations, or the environment data 316 and 318 no longer match, or location cannot be determined due to loss of coverage (e.g., loss of wireless location signals 306), then the device presence determination module 304 determines that the computing device 102 and the secondary device are no longer in the presence of each other. The device presence determination module 304 provides a presence indication 314 indicating that the devices are not in the presence of each other, which prohibits the multi-device engagement by the devices. Accordingly, in such situations the multi-device engagement is terminated or canceled.

Similarly, situations can arise in which one or both of the computing device 102 and the secondary device loses power. In such situations, the device presence determination module 304 of the device that still has power determines that the computing device 102 and the secondary device are no longer in the presence of each other. The device presence determination module 304 provides a presence indication 314 indicating that the devices are not in the presence of each other, which prohibits the multi-device engagement by the devices. Accordingly, in such situations the multi-device engagement is terminated or canceled.

In one or more embodiments, the computing device 102 and the secondary device have been previously paired with each other or have been otherwise discovered by or associated with each other in the past. This allows the computing device 102 and the secondary device to be aware of each other and able to communicate with each other to perform multi-device engagement. This also allows the user to interact with a single device in order to perform the multi-device engagement. For example, the user can interact with the application 114 to have the application 114 perform a particular multi-device engagement action (such as copying data between the devices) but need not further identify or interact with the secondary device. The user need not input an identifier of the secondary device to the computing device 102, need not provide input via a user interface of the secondary device, and so forth.

It should also be noted that discussions are made herein with reference to computing device 102 and a secondary device being in the presence of one another. However, a similar determination can be made between the computing device 102 and any number of additional devices. Accordingly, the techniques discussed herein may be applied for the computing device 102 and any number of secondary devices concurrently, allowing multi-device engagement to be performed among any two or more devices.

It should further be noted that even if the computing device 102 is no longer in the presence of one secondary device, the computing device 102 can still be in the presence of one or more additional secondary devices. For example, assume that the computing device 102 is determined to be in the presence of secondary device A and secondary device B. If the computing device 102 and secondary device A are later determined to no longer be in the presence of one another, but the computing device 102 remains in the presence of secondary device B, then the multi-device engagement between the computing device 102 and the secondary device B can continue although the multi-device engagement between the computing device 102 and the secondary device A is terminated and user is optionally alerted of this change. Additionally or alternatively, if the computing device 102, the secondary device A, and the secondary device B are operating in a multi-device engagement requiring all three devices be in the presence of one another, the multi-device engagement is terminated or canceled in response to the computing device 102, the secondary device A, and the secondary device B no longer being in the presence of one another.

Figure 4:
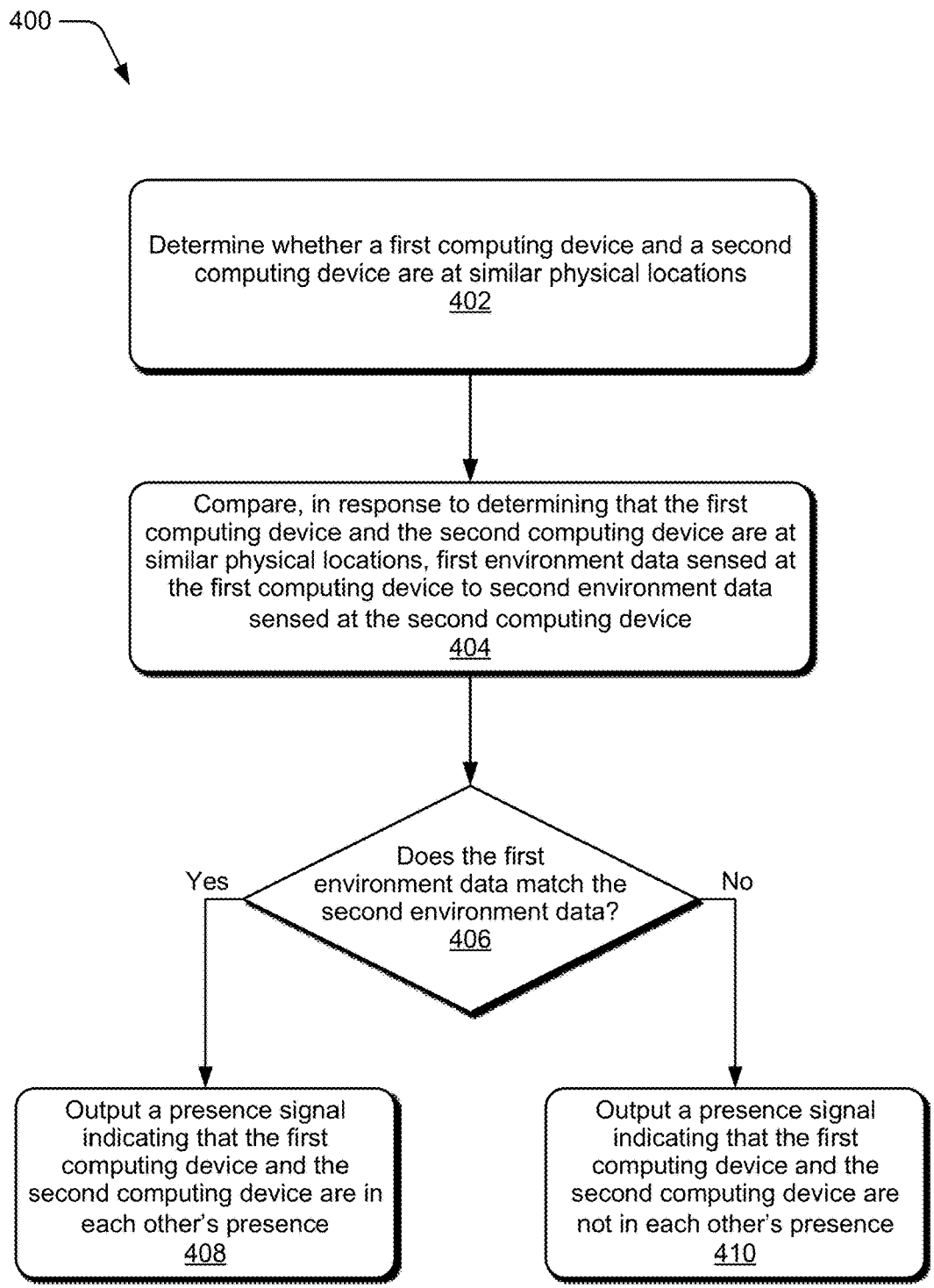
FIG. 4 illustrates an example process for implementing the techniques discussed herein in accordance with one or more embodiments.

FIG. 4 illustrates an example process 400 for implementing the techniques discussed herein in accordance with one or more embodiments. Process 400 is carried out by a device presence detection system, such as the device presence detection system 122 of FIG. 1 or FIG. 3, and can be implemented in software, firmware, hardware, or combinations thereof. Process 400 is shown as a set of acts and is not limited to the order shown for performing the operations of the various acts.

In process 400, a determination is made as to whether a first computing device and a second computing device are at similar physical locations (act 402). This determination is made based on wireless location signals received at the first computing device and wireless location signals received at the second computing device.

First environment data sensed at the first computing device is compared to second environment data sensed at the second computing device (act 404). In one or more embodiments, this comparison is performed in response to determining that the first computing device and the second computing device are at similar physical locations.

A determination is made as to whether the first environment data matches the second environment data (act 406), and process 400 proceeds based on whether the first environment data matches the second environment data. In response to determining that the first environment data matches the second environment data, a presence signal indicating that the first computing device and the second computing device are in each other's presence is output (act 408). However, in response to determining that the first environment data does not match the second environment data, a presence signal indicating that the first computing device and the second computing device are not in each other's presence is output (act 410).

Figure 5:
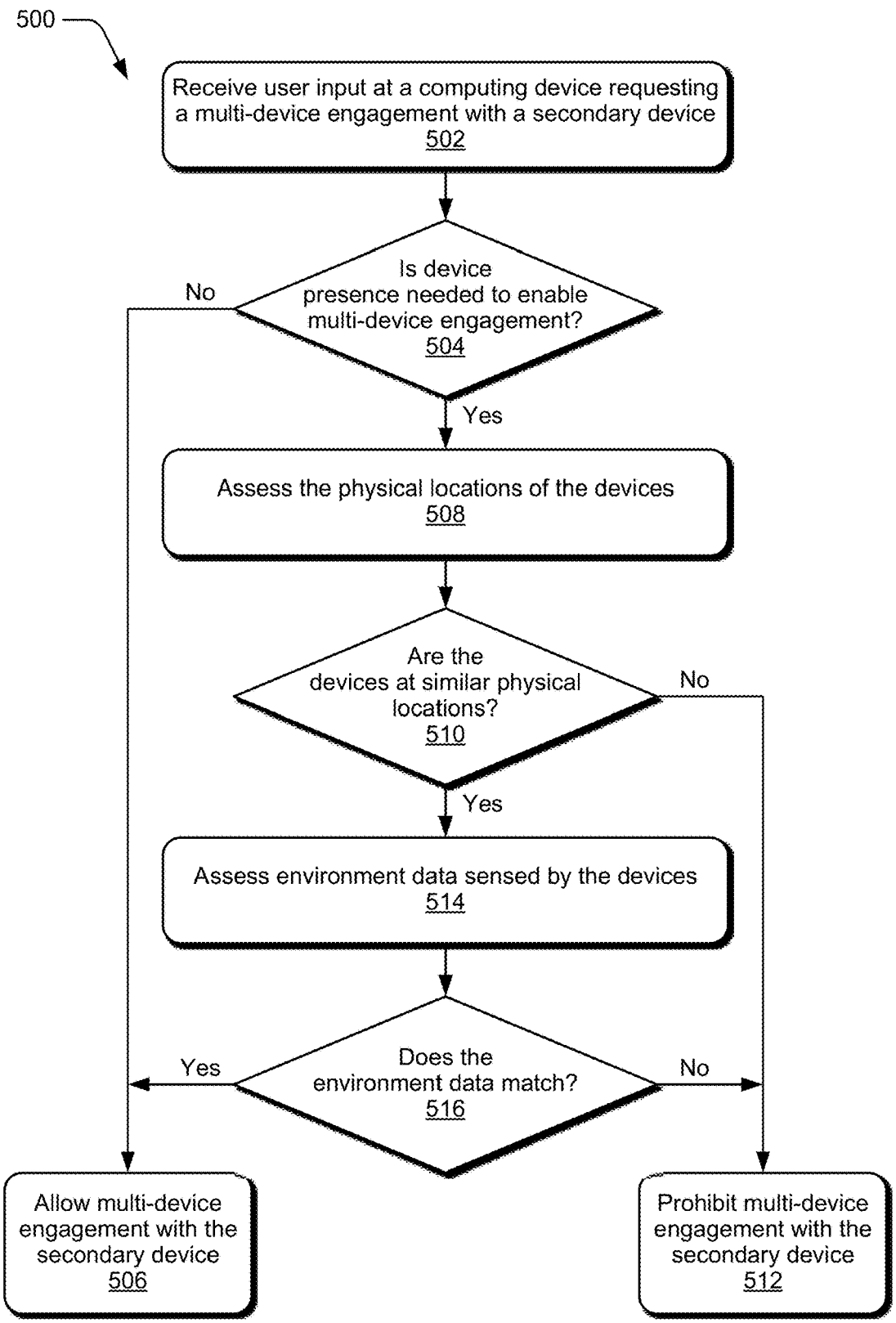
FIG. 5 illustrates another example process for implementing the techniques discussed herein in accordance with one or more embodiments.

FIG. 5 illustrates an example process 500 for implementing the techniques discussed herein in accordance with one or more embodiments. Process 500 is carried out by an application or other program, such as an application 114 of FIG. 1, and a device presence detection system, such as the device presence detection system 122 of FIG. 1 or FIG. 3, and can be implemented in software, firmware, hardware, or combinations thereof Process 500 is shown as a set of acts and is not limited to the order shown for performing the operations of the various acts.

In process 500, a user input at a computing device requesting a multi-device engagement with a secondary device is received (act 502). This user input can be received in various different manners, such as by interacting with a user interface of the computing device, provided to the computing device from a different device or system, and so forth. During one or both of the determination of whether two devices are in the presence of each other and whether multi-device engagement can be performed, a device optionally queries a user to confirm presence and the user can respond manually (e.g., via voice or touch selection).

A determination is made as to whether device presence is needed to enable multi-device engagement (act 504). This device presence refers to the computing device and the secondary device being in the presence of each other. In response to determining that device presence is not needed, multi-device engagement with the secondary device is allowed (act 506). No determination of whether the computing device and the secondary device are in the presence of each other need be made if device presence is not needed to enable multi-device engagement.

In response to determining that device presence is needed, the physical locations of the devices are accessed (act 508). These physical locations are determined based on location data received at the devices as discussed above.

A determination is made as to whether the devices are at similar physical locations (act 510). In response to determining that the devices are not at similar physical locations, multi-device engagement with the secondary device is prohibited (act 512). If the devices are not at similar physical locations then the devices are not in the presence of each other, so multi-device engagement is not permitted.

In response to determining that the devices are at similar physical locations, environment data sensed by the devices is accessed (act 514) and a determination is made as to whether the environment data sensed by the devices matches (act 516). In response to determining that the environment data sensed by the devices matches, multi-device engagement with the secondary device is allowed (act 506). However, in response to determining that the environment data sensed by the devices does not match, multi-device engagement with the secondary device is prohibited (act 512).

Figure 6:
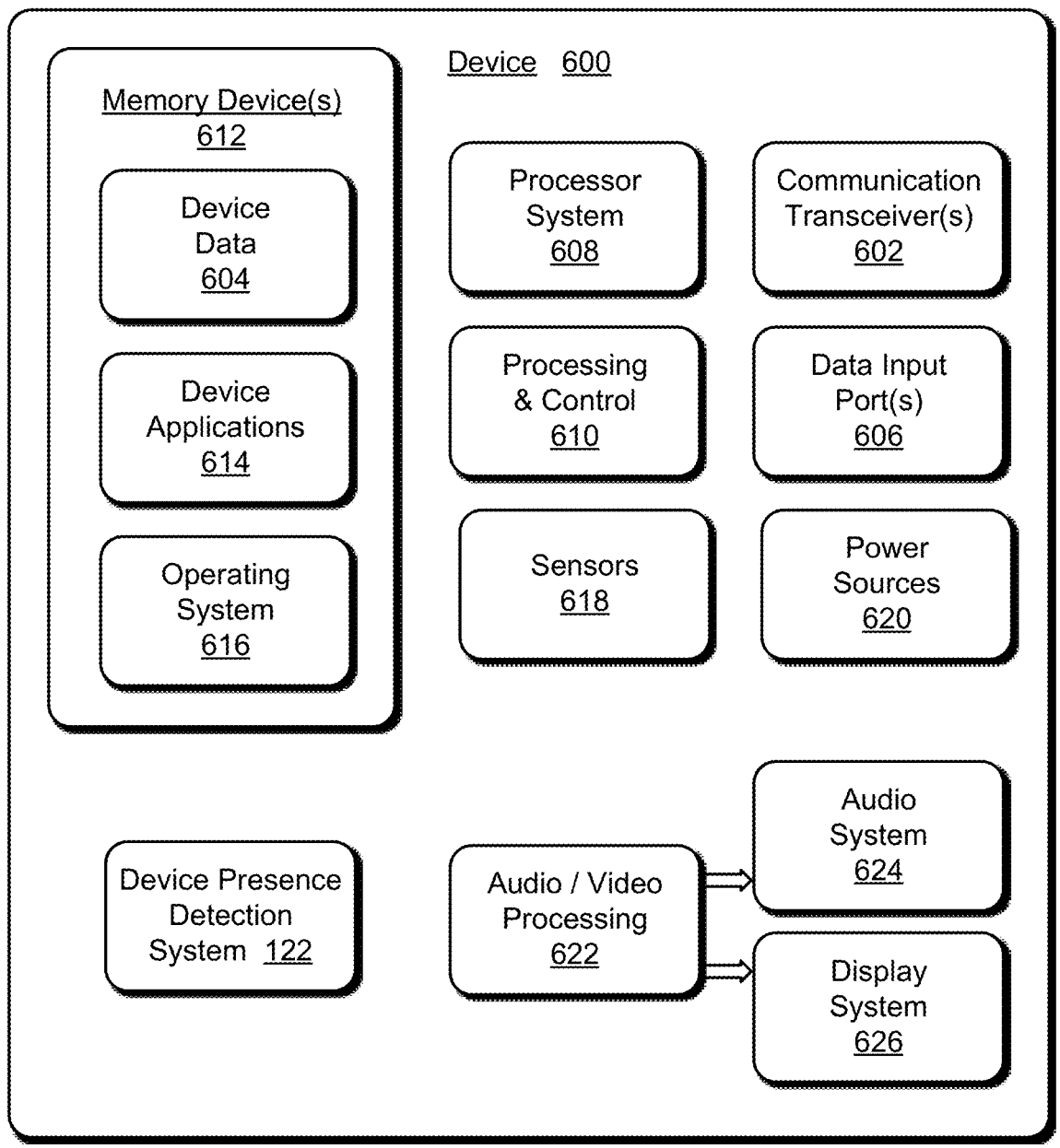
FIG. 6 is an illustration of an example device in accordance with one or more embodiments.

FIG. 6 illustrates various components of an example electronic device 600 in which embodiments of enabling vibration notification based on environmental noise can be implemented. The electronic device 600 can be implemented as any of the devices described with reference to the previous FIGS., such as any type of client device, mobile phone, tablet, computing, communication, entertainment, gaming, media playback, and/or other type of electronic device. In one or more embodiments the electronic device 600 includes a device presence detection system 122, described above.

The device 600 includes communication transceivers 602 that enable wired and/or wireless communication of device data 604 with other devices. The device data 604 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system 608 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory devices 612 that enable data storage, such as data storage devices that can be accessed by a computing device, and that provide persistent storage of data and executable instructions (e.g., software applications, programs, functions, and the like). Examples of the computer-readable storage memory devices 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 612 provides data storage mechanisms to store the device data 604, other types of information and/or data, and various device applications 614 (e.g., software applications). For example, an operating system 616 can be maintained as software instructions with a memory device and executed by the processing system 608. Additionally, although illustrated separate from the computer-readable storage memory device 612, the communication system 106 can be maintained as one of device applications 614. The device applications may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 620, such as when the device is implemented as a mobile device. The power sources may include a charging and/or power system, and can be implemented as a flexible strip battery, a rechargeable battery, a charged super-capacitor, and/or any other type of active or passive power source.

The device 600 additionally includes an audio and/or video processing system 622 that generates audio data for an audio system 624 and/or generates display data for a display system 626. In accordance with some embodiments, the audio/video processing system 622 is configured to receive call audio data from the communication system 106 and communicate the call audio data to the audio system 624 for playback at the device 600. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although the embodiments described above have been described in language specific to features or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described, and it is to be appreciated that each described embodiment can be implemented independently or in connection with one or more other described embodiments. Additional aspects of the techniques, features, and/or methods discussed herein relate to one or more of the following:

A method, comprising: determining, based on wireless location signals received at a first computing device and a second computing device, whether the first computing device and the second computing device are at similar or proximate physical locations; comparing, in response to determining that the first computing device and the second computing device are at similar physical locations, first environment data sensed at the first computing device to second environment data sensed at the second computing device; determining whether the first environment data matches the second environment data; outputting, in response to determining that the first environment data matches the second environment data and determining that the first computing device and the second computing device are at similar or proximate physical locations, a presence signal indicating that the first computing device and the second computing device are in each other's presence; and allowing, in response to determining that the first environment data matches the second environment data, multi-device engagement between the first computing device and the second computing device.

Alternatively or in addition to the above described method, any one or combination of the following. The wireless location signals comprising Wi-Fi or GPS signals. The first environment data comprising audio sensed at the first computing device and the second environment data comprising audio sensed at the second computing device. The audio comprising voices of people. The first environment data comprising video sensed at the first computing device and the second environment data comprising video sensed at the second computing device. The first environment data comprising motion sensed at the first computing device and the second environment data comprising motion sensed at the second computing device. The outputting the presence signal comprising outputting the presence signal indicating that the first computing device and the second computing device are not in each other's presence in response to determining that the first environment data does not match the second environment data, and the allowing comprising allowing multi-device engagement between the first computing device and the second computing device only in response to determining that the first environment data matches the second environment data. The outputting the presence signal indicating comprising outputting the presence signal indicating that the first computing device and the second computing device are not in each other's presence in response to determining that the first computing device and the second computing device are not at similar physical locations, and the allowing comprising allowing multi-device engagement between the first computing device and the second computing device only in response to determining that the first environment data matches the second environment data.

A first computing device comprising: a sensor; a location signal receiver; one or more processors; and one or more computer readable storage media storing computer-readable instructions which, when executed, perform operations including: determining, based on wireless location signals received by the location signal receiver and a second computing device, whether the first computing device and the second computing device are at similar physical locations; determining, based on first environment data sensed by the sensor and second environment data sensed at the computing device, whether the first environment data matches the second environment data; outputting, in response to determining that the first environment data matches the second environment data and determining that the first computing device and the second computing device are at similar physical locations, a presence signal indicating that the first computing device and the second computing device are in each other's presence; and allowing, in response to determining that the first environment data matches the second environment data, multi-device engagement between the first computing device and the second computing device.

Alternatively or in addition to the above described first computing device, any one or combination of the following. The wireless location signals comprising Wi-Fi or GPS signals or cellular signals. The first environment data comprising audio sensed at the first computing device and the second environment data comprising audio sensed at the second computing device. The audio comprising voices of people. The first environment data comprising video sensed at the first computing device and the second environment data comprising video sensed at the second computing device. The first environment data comprising motion sensed at the first computing device and the second environment data comprising motion sensed at the second computing device.

A first computing device comprising: a location signal receiver; a sensor; a location determination module to determine, based on wireless location signals received by the location signal receiver, a location of the first computing device; and a device presence determination module to determine, based on the location of the first computing device and a location of a second computing device, whether the first computing device and the second computing device are at similar physical locations, and determine, based on first environment data sensed by the sensor and second environment data sensed at the computing device, whether the first environment data matches the second environment data, and output, in response to determining that the first environment data matches the second environment data and determining that the first computing device and the second computing device are at similar physical locations, a presence signal indicating that the first computing device and the second computing device are in each other's presence.

Alternatively or in addition to the above described first computing device, any one or combination of the following. The wireless location signals comprising Wi-Fi or GPS signals or cellular signals. The first environment data comprising audio sensed at the first computing device and the second environment data comprising audio sensed at the second computing device. The audio comprising voices of people. The first environment data comprising video sensed at the first computing device and the second environment data comprising video sensed at the second computing device. The first environment data comprising motion sensed at the first computing device and the second environment data comprising motion sensed at the second computing device.

What is claimed is:

1. A method, comprising:
   determining, based on wireless location signals received at a first computing device and a second computing device, whether the first computing device and the second computing device are at similar physical locations;
   comparing, in response to determining that the first computing device and the second computing device are at similar physical locations, first environment data sensed at the first computing device to second environment data sensed at the second computing device;
   determining whether the first environment data matches the second environment data;
   outputting, in response to determining that the first environment data matches the second environment data and determining that the first computing device and the second computing device are at similar physical locations, a presence signal indicating that the first computing device and the second computing device are in each other's presence;
   prohibiting, in response to determining that the first environment data does not match the second environment data, multi-device engagement between the first computing device and the second computing device; and
   allowing, in response to determining that the first environment data matches the second environment data, multi-device engagement between the first computing device and the second computing device.

2. The method as recited in claim 1, the wireless location signals comprising Wi-Fi or GPS signals.

3. The method as recited in claim 1, the first environment data comprising audio sensed at the first computing device and the second environment data comprising audio sensed at the second computing device.

4. The method as recited in claim 3, the audio comprising voices of people.

5. The method as recited in claim 1, the first environment data comprising video sensed at the first computing device and the second environment data comprising video sensed at the second computing device.

6. The method as recited in claim 1, the first environment data comprising motion sensed at the first computing device and the second environment data comprising motion sensed at the second computing device.

7. The method as recited in claim 1, the outputting the presence signal comprising outputting the presence signal indicating that the first computing device and the second computing device are not in each other's presence in response to determining that the first environment data does not match the second environment data, and the allowing comprising allowing multi-device engagement between the first computing device and the second computing device only in response to determining that the first environment data matches the second environment data.

8. The method as recited in claim 1, the outputting the presence signal indicating comprising outputting the presence signal indicating that the first computing device and the second computing device are not in each other's presence in response to determining that the first computing device and the second computing device are not at similar physical locations, and the allowing comprising allowing multi-device engagement between the first computing device and the second computing device only in response to determining that the first environment data matches the second environment data.

9. A first computing device comprising:
   a sensor;
   a location signal receiver;
   one or more processors; and
   one or more non-transitory computer readable storage media storing computer-readable instructions which, when executed, perform operations including:
      determining, based on wireless location signals received by the location signal receiver and a second computing device, whether the first computing device and the second computing device are at similar physical locations;
      determining, based on first environment data sensed by the sensor and second environment data sensed at the computing device, whether the first environment data matches the second environment data;
      outputting, in response to determining that the first environment data matches the second environment data and determining that the first computing device and the second computing device are at similar physical locations, a presence signal indicating that the first computing device and the second computing device are in each other's presence;
      prohibiting, in response to determining that the first environment data does not match the second environment data, multi-device engagement between the first computing device and the second computing device; and
      allowing, in response to determining that the first environment data matches the second environment data, multi-device engagement between the first computing device and the second computing device.

10. The first computing device as recited in claim 9, the wireless location signals comprising Wi-Fi or GPS signals.

11. The first computing device as recited in claim 9, the first environment data comprising audio sensed at the first computing device and the second environment data comprising audio sensed at the second computing device.

12. The first computing device as recited in claim 11, the audio comprising voices of people.

13. The first computing device as recited in claim 9, the first environment data comprising video sensed at the first computing device and the second environment data comprising video sensed at the second computing device.

14. The first computing device as recited in claim 9, the first environment data comprising motion sensed at the first computing device and the second environment data comprising motion sensed at the second computing device.

15. A first computing device comprising:
   a location signal receiver;
   a sensor;

a location determination module to determine, based on wireless location signals received by the location signal receiver, a location of the first computing device; and a device presence determination module to determine, based on the location of the first computing device and a location of a second computing device, whether the first computing device and the second computing device are at similar physical locations, and determine, based on first environment data sensed by the sensor and second environment data sensed at the computing device, whether the first environment data matches the second environment data, output, in response to determining that the first environment data matches the second environment data and determining that the first computing device and the second computing device are at similar physical locations, a presence signal indicating that the first computing device and the second computing device are in each other's presence, and prohibit, in response to determining that the first environment data does not match the second environment data, multi-device engagement between the first computing device and the second computing device.

16. The first computing device as recited in claim 15, the wireless location signals comprising Wi-Fi or GPS signals.

17. The first computing device as recited in claim 15, the first environment data comprising audio sensed at the first computing device and the second environment data comprising audio sensed at the second computing device.

18. The first computing device as recited in claim 17, the audio comprising voices of people.

19. The first computing device as recited in claim 15, the first environment data comprising video sensed at the first computing device and the second environment data comprising video sensed at the second computing device.

20. The first computing device as recited in claim 15, the first environment data comprising motion sensed at the first computing device and the second environment data comprising motion sensed at the second computing device.

* * * * *